United States Patent

Reumerman et al.

[11] Patent Number: 6,128,297
[45] Date of Patent: Oct. 3, 2000

[54] PACKET SWITCHING SYSTEM AND NETWORK INTERFACE HAVING A SWITCHING DEVICE

[75] Inventors: Hans-Jürgen Reumerman, Aachen, Germany; Andries Van Wageningen, Wijlre, Netherlands

[73] Assignee: U.S. Philips Corporation, New York, N.Y.

[21] Appl. No.: 08/844,962

[22] Filed: Apr. 23, 1997

Related U.S. Application Data

[63] Continuation of application No. 08/458,208, Jun. 2, 1995, abandoned.

[30] Foreign Application Priority Data

Jun. 3, 1994 [DE] Germany ............... P 44 19 344

[51] Int. Cl.[7] .................................................. H04L 12/56
[52] U.S. Cl. ..................... 370/391; 370/395; 370/428; 395/200.01
[58] Field of Search .................... 370/375, 372, 370/374, 354, 395, 398, 392, 391, 417, 412, 422, 426, 460, 465, 414; 710/52

[56] References Cited

U.S. PATENT DOCUMENTS

| | | | |
|---|---|---|---|
| 4,603,416 | 7/1986 | Servel et al. ............... | 370/395 |
| 4,661,952 | 4/1987 | Sichart et al. ............. | 370/460 |
| 4,841,523 | 6/1989 | Roffinella et al. .......... | 370/465 |
| 4,884,264 | 11/1989 | Servel et al. .............. | 370/422 |
| 4,891,802 | 1/1990 | Jasmer et al. .............. | 370/416 |
| 4,962,497 | 10/1990 | Ferenc et al. .............. | 370/354 |
| 5,093,827 | 3/1992 | Franklin et al. ............ | 370/354 |
| 5,157,654 | 10/1992 | Cisneros et al. ............ | 370/414 |
| 5,233,603 | 8/1993 | Takeuchi et al. ............ | 370/412 |
| 5,335,325 | 8/1994 | Frank et al. ............... | 711/170 |
| 5,365,519 | 11/1994 | Kozaki et al. .............. | 370/391 |
| 5,392,412 | 2/1995 | McKenna .................... | 710/52 |
| 5,440,545 | 8/1995 | Buchholz et al. ............ | 370/426 |

OTHER PUBLICATIONS

"ATM–Die Technik des Breitband–ISDN," von Gerd Siegmund, 2., uberarbeitete und erweiterte Auflage, 1993.

Ahmadi, H. and Denzel, W., "A Survey of Modern High-Performance Switching Techniques", IEEE Journal on Selected Areas in Communications, vol. 7, No. 7, Sep. 1989, pp. 1091–1103.

*Primary Examiner*—Alpus H. Hsu
*Assistant Examiner*—Afsar M. Qureshi
*Attorney, Agent, or Firm*—David R. Treacy

[57] ABSTRACT

The invention relates to a packet switching system comprising at least a coupling device which comprises a main memory for buffering packets arriving by auxiliary lines, a main memory controller for generating addresses for the packets to be stored in the main memory and for controlling the write and read operations of the packets and a demulfiplexer controlled by the main memory controller for transporting the packets by trunk lines. The main memory controller comprises an address memory for producing an address for a write operation, buffers assigned to each trunk line, for buffering the addresses produced by the address memory, and a decoding device. The decoding device is provided for selecting a buffer for an address to be stored in dependence on the destination of the packet, for selecting a buffer for producing an address for the read operation from the main memory and for accordingly controlling the demultiplexer.

20 Claims, 4 Drawing Sheets

PACKET SWITCHING SYSTEM AND NETWORK INTERFACE HAVING A SWITCHING DEVICE

This is a continuation of application Ser. No. 08/458,208, filed Jun. 2, 1995 abandoned, parent of a FWC application.

BACKGROUND OF THE INVENTION

1 Field of the Invention

The invention relates to a packet switching system comprising at least a switching device which comprises
- a main memory for buffering packets arriving by auxiliary lines,
- a main memory controller for generating addresses to store the packets in the main memory and for controlling the write and read operations of the packets, and
- a demultiplexer controlled by the main memory controller, for transporting the packets by trunk lines.

2. Discussion of the Related Art

Such a packet switching system is known from the title "ATM—Die Technik des Breitband-ISDN" by Gerd Siegmund, R.v. Deckers' Verlag, Heidelberg, 1993, pages 169 to 176. The switching device described there operates in the asynchronous transfer mode.

When an asynchronous transfer mode is used in a switching system, payload, for example, telephone, video or sound signals, is sent in blocks of a fixed length through arrangements for digital signal processing. By a block of a fixed length is meant a cell which contains a given number of bytes (for example, 53 bytes). Each cell contains a header field having a length of, for example, 5 bytes, and an information field which accommodates the payload and has a length of, for example, 48 bytes. In such a header field are available routing indicators, error recognition data and control data. Routing indicators are meant to be understood as trunk identifiers and link identifiers. The link identifier, also referenced VCI (virtual channel identifier), contains the description of the destination of the cell in the system. To transmit a cell, a virtual channel is made available in response to the virtual channel identifier. As a rule, a VCI is changed each time a switching point is reached. A trunk group of various virtual channels is referenced a virtual path. A virtual path is identified by the trunk identifier. Such a virtual path is called a virtual path identifier (VPI). Cells are assigned to consecutively determined periods of time. The length of such a period of time depends on the clock rate used as a basis of the transfer components. If no payload is available, empty cells i.e. cells without payload, are transmitted in such a period of time. Cells containing payload are referenced payload cells.

Said switching device is based on the main-memory principle. All arriving cells are written in a main memory or read from its output. It is also possible that a cell is copied then. The main memory controller marks the cells in the main memory and controls the write and read operations of the main memory. The circuit structure of the switching device will not be further described in this publication.

SUMMARY OF THE INVENTION

Therefore, it is an object of the invention to provide in a packet switching system a main memory controller for a switching device that operates according to the main-memory principle.

The object of the invention will be achieved by a packet switching system of the type defined in the opening paragraph, in that the main memory controller comprises
- an address memory for producing an address for a write operation,
- a respective buffer assigned to each trunk line, for buffering the addresses produced by the address memory, and
- a decoding device, which is provided
  - for selecting a buffer for an address to be stored in dependence on the destination of the packet,
  - for selecting a buffer for producing an address intended to be read from the main memory, and
  - for accordingly controlling the demultiplexer.

The main memory controller of the packet switching system according to the invention comprises an address memory, a plurality of buffers and a decoding device. When a packet is to be written in the main memory, the address memory produces an address for the memory area in which the packet is to be stored. If the packet switching system operates in the asynchronous transfer mode, the memory areas are all of the same size. If consecutive packets have different lengths (different numbers of bytes), the size of the memory area may be tuned, for example, to the longest available packet. It is also possible to establish the length of each packet before it is written and to determine the size of the memory area based upon the length of the packet.

The number of buffers in the main memory controller depends on the number of trunk lines. For example, if 8 trunk lines are coupled to the main memory, 8 buffers are to be available. A memory-produced address for the memory location that contains the stored packet as a result of the write operation is buffered in the buffer(s) which is (are) assigned to a trunk line(s). The decoding device determines the destination(s) of the packet on the basis of the routing indicator accompanying a cell packet and selects the buffer(s) for storing the address for the write operation.

Additionally, the decoding device also controls the reading of the packets from the main memory. In a predefined order the decoding device releases the buffers for buffered addresses to be read out which are then fed to the main memory. For example, the decoding device can cyclically release the buffers with the prerequisite that addresses be contained in the respective buffers. If a buffer does not contain addresses, it is skipped. If an address for the read operation is produced, the demultiplexer will be controlled simultaneously in such a way that the trunk line assigned to the released buffer accommodates the packet that has been read out.

For obtaining a uniform use of all the memory areas of the main memory, the address memory is provided
- for receiving the addresses used for the read operation and coming from the buffers, and
- after the first issue of all the addresses, for producing further addresses in the order realised by the buffers.

The address memory operates according to the FIFO principle (First-In, First-Out), i.e. the re-entered addresses are issued again in the order in which they have come in.

If a cell is to be conveyed to more than one destination, an address will be written in more than one buffer. This address cannot be fed to the address memory for re-entry and subsequent issuance as described above, until the address has been read from all the buffers in which it has been written. This is realised via an availability memory, a gate circuit or a gate controller which are included in the main memory controller. The availability memory is used for storing a count of the number of copies of this address contained in the buffers. If a buffer is released, the gate circuit is used for transferring an address read from a buffer. The gate controller is used for decrementing the count and for releasing the gate circuit if the count matches a predefined value.

The decoding device comprises an evaluation circuit, a write decoder and a read decoder. The evaluation circuit is used for evaluating the destination based upon the routing indicator added to the packet and the write decoder receiving the destination from the evaluation circuit is used for releasing a buffer during a write cycle which buffer is featured for buffering an address. The read decoder releases the buffers during a read cycle in a predefined order, so that the addresses can be read out.

The packet switching system may be arranged as a local area network operating in the asynchronous transfer mode (ATM), which is arranged for transmitting packets of a fixed length (cells). Such a local area network comprises a plurality of stations which are coupled to send and receive ring lines via network interfaces. Each network interface comprises a coupling device coupled via auxiliary lines to at least a receive ring line, at least a station and at least a controller and via trunk lines to at least a send ring line, at least a station and at least a controller.

The coupling device of a network interface of the local area network comprises an input multiplexer which is used for transporting the cells coming from the auxiliary lines to the main memory and for directing the routing indicator added to each cell to the main memory controller. The input multiplexer is controlled by a receive controller which regulates the arrival of cells from (i) at least a receive ring line, (ii) at least a station and (iii) at least a controller.

The demultiplexer is used for coupling the output of the main memory to (i) at least a controller, (ii) at least a send ring line (iii) and at least a station. For controlling the demultiplexer, the read decoder of the main memory controller is used.

In conformity with standardization proposals or regulations, certain bits in the header field of a cell are reserved for the VCI (virtual channel identifier) and for the VPI (virtual path identifier). The VCI indicates a virtual channel and the VPI a virtual path. The bits reserved for the VCI (Virtual Channel Identifier) in the header field of the cell contain the information about the identification of a channel, the type of channel and the type of cell and the bits reserved for the VPI (Virtual Path Identifier) contain the information about the address. In the receiving circuits coupled to the receive controller, a routing indicator is determined from the VCI and added to the cell. The routing indicator is separated in the input multiplexer and applied to the main memory controller.

The invention likewise relates to a network interface for a local area network operating in the asynchronous transfer mode (ATM) to which interface are coupled a station and send and receive ring lines, which interface includes a coupling device. The coupling device comprises a main memory for buffering cells coming from the station or the controller and arriving by at least a receive ring line, a main memory controller comprising an address memory for supplying addresses to the main memory for a write operation, respective buffers assigned to at least a send ring line, the station and the controller, for buffering the addresses supplied by the address memory, and a decoding device which is provided for selecting a buffer to store an address in dependence on the destination of the cell, for selecting a buffer to supply an address intended for the read operation, for accordingly controlling a demultiplexer which is provided to transfer the cells to at least a send ring line, to the station and to the controller.

These and other aspects of the invention will be apparent from and elucidated with reference to the embodiments described hereinafter.

DETAILED DESCRIPTION OF THE PREFERRED EMBODIMENTS

Figure 1:
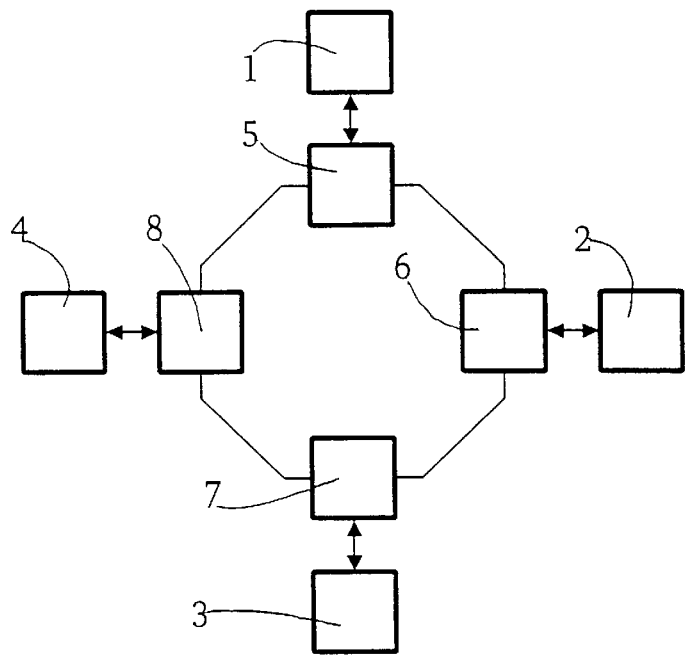
FIG. 1 shows a local area network.

FIG. 1 shows an illustrative embodiment for a packet switching system arranged as a local area network comprising four stations 1 to 4 which are coupled each to ring lines via assigned network interfaces 5 to 8. A station 1 to 4 may be, for example, a videophone, a personal computer or a workstation or telephone, respectively. The messages or information signals respectively, originating from the stations 1 to 4 or the network interfaces 5 to 8 are transmitted in the asynchronous transfer mode by means of cells. A cell contains a header field of 5 bytes and an information field of 48 bytes. The information contained in the header field of the cell is especially used for addressing and for executing switching functions.

Figure 2:
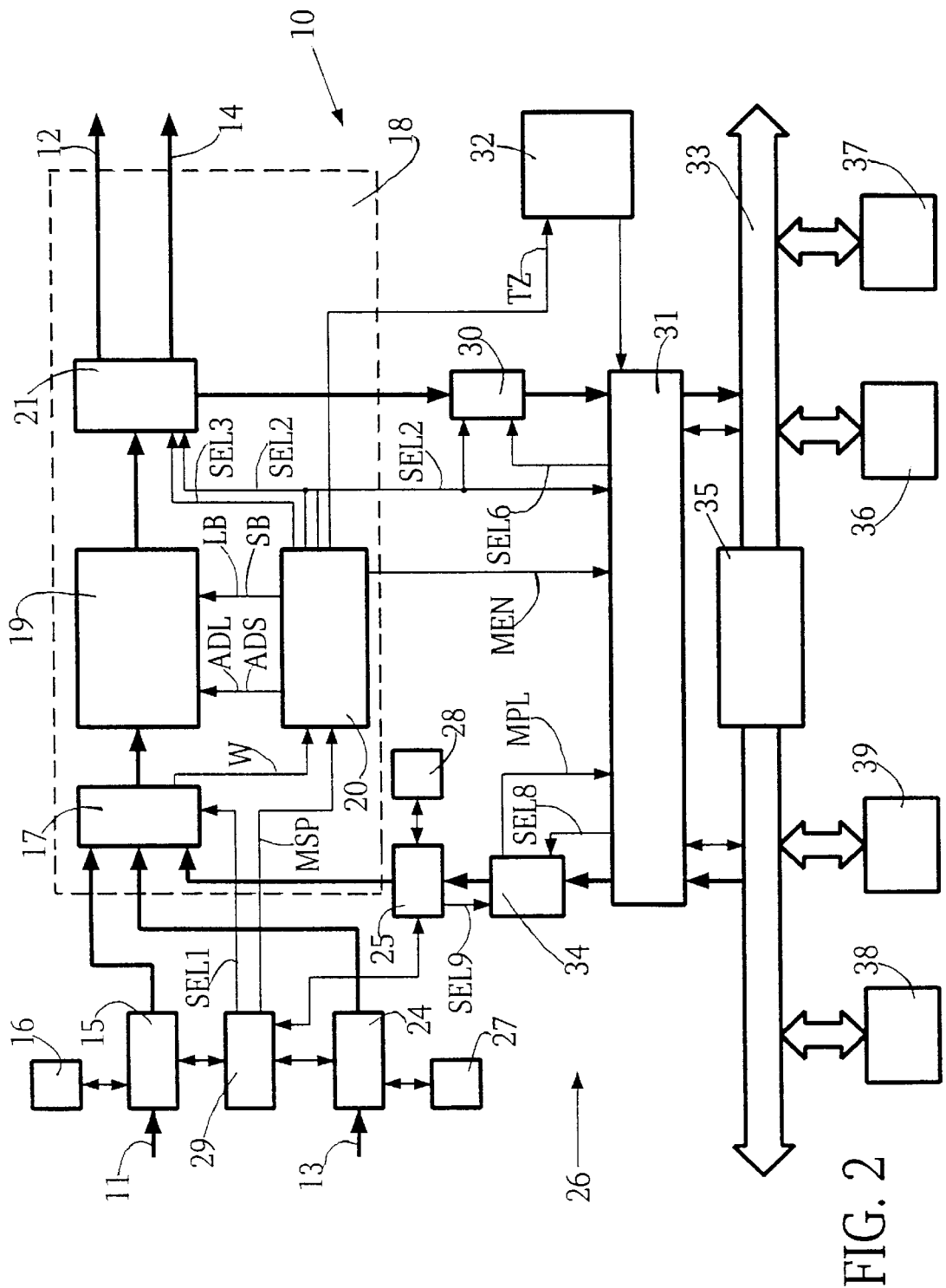
FIG. 2 shows a network interface that can be used in the local area network shown in FIG. 1.

FIG. 2 gives a detailed representation of a network interface 10 which is coupled, via a receive ring line 11 and send ring line 12, to further network interfaces and, via internal connections 13 and 14, to a station 1, 2, 3 or 4. A receiving circuit 15 included in the network interface 10 receives a cell stream from the receive ring line 11. In a buffer (not further shown) in the receiving circuit 15 is the cell stream at least adapted to an internal clock signal, a cell buffered, the header field of the cell evaluated, the information of the header field changed and routing indicator (tag) added to the cell. The routing indicator contains at least the destinations of the cell within the network interface 10 (for example, send ring line 12).

The receiving circuit 15 is connected to a routing Table 16 which supplies data to the receiving circuit 15 in dependence on information in the header field of a cell. For this purpose, certain parts of the data in the header field are used as a memory address for the routing Table 16, which Table supplies the data stored at the memory address to the receiving circuit 15. For example, a new address is inserted into the header field of a cell and the routing indicator W of, for example, 2 bytes is added to the cell.

The output of the receiving circuit 15 is coupled to an input multiplexer 17 which forms part of a coupling device 18. The coupling device 18 furthermore includes a main memory 19, a main memory controller 20 and a demultiplexer 21. The input multiplexer 17 directs the cells to a main memory 19, separates the routing indicator W from the received cell and transports this routing indicator to the main memory controller 20.

The input multiplexer 17 further receives cells from two more receiving circuits 24 and 25. The receiving circuits 24 and 25 are supplied with cells from the assigned station 1, 2, 3 or 4 via the internal connection 13 and with a cell stream from a control arrangement 26, respectively. (See FIG. 2) The receiving circuits 24 and 25 operating in like manner to receiving circuit 15 are also connected to routing Tables 27 and 28, respectively.

The receiving circuits 15, 24 and 25 announce the arrival of a cell by means of a message signal MSP to a receive controller 29. The receive controller 29 sends a selection signal SEL1 to the input multiplexer 17 which connects one of its inputs to the input of the main memory 19 in response to the selection signal SEL1 and applies the routing indicator W of a cell conveyed to the main memory 19 to the main memory controller 20.

Furthermore, the receive controller 29 switches release signals to the receiving circuits 15, 24 and 25 which signals cause a cell to be read from a receiving circuit 15, 24 or 25. The receive controller 29 cyclically releases a receiving circuit 15, 24 or 25 for a cell to be read out by the input multiplexer. Similar receiving circuits and receive controllers to the receiving circuits 15, 24 and 25 and the receive controller 29 are used in currently available packet switching systems.

The main memory controller 20 supplies write addresses ADS to the main memory 19 during the write operation and releases, via a write release signal SB, the main memory 19 so that it can be written. Before that, the message that a cell is to be stored must have been received from the receive controller 29 via the message signal MSP. The read process is controlled in the main memory controller 20 in dependence on the received routing indicator. During the read operation the main memory controller 20 feeds the main memory 19 with read addresses ADL and releases via a read release signal LB the main memory 19 so that it can be read out.

A cell read from the main memory 19 is fed to the demultiplexer 21 which conveys a cell either (i) to the send ring line 12, (ii) to the internal connection 14 or (iii) to an input annex storage 30. If a cell has reached the input annex storage 30, which forms part of the control arrangement 26, an access controller 31 included in the control arrangement 26 receives an appropriate message via a message signal MEN. Furthermore, selection signals SEL2 and SEL3 which control the demultiplexer 21 are applied to the demultiplexer 21 by the main memory controller 20. As further referred to and discussed hereinafter, the control arrangement 26 (see FIG. 2) includes receiving circuit 25, routing table 28, output annex storage 34, access controller 31, input annex storage 30, and table 32. As shown in FIG. 2, control arrangement 26 is operatively coupled to coupling device 18 via an auxiliary line connected between receiving circuit 25 and multiplexer 17. Control arrangement 26 is further operatively coupled to coupling device 18 via a trunk line connected between demultiplexer 21 and input annex storage 30. Still further, control arrangement 26 is operatively coupled to coupling device 18 via signal lines MEN and SEL2 between main memory controller 20 and access controller 31.

The access controller 31 receives from a Table 32 information about which bytes of the cells stored in the input annex storage 30 are conveyed to a bus system 33 coupled to the access controller 31. Furthermore, additional information Z coming from the Table 32 with the selected bytes and/or additional information Z may be fed to the bus system 33 from the input annex storage 30 or Table 32. What data the Table 32 supplies to the bus system 33 depends on a Table pointer TZ supplied by the main memory controller 20. The Table pointer TZ is inserted into the routing indicator W which routing indicator is added to the cells in the receiving circuits 15 and 24. In the main memory controller 20 a Table pointer is separated from the routing indicator W, buffered and applied to the Table 32 as an address.

The parts of the cell which are not fed to the bus system 33 are conveyed by the access controller 31 to an output annex storage 34 arranged between receiving circuit 25 and access controller 31. The bus system 33 comprises a bus controller 35, which controls the bus traffic between the access controller 31 and further units connected to the bus system 33, such as, for example, arithmetic and logic unit (ALU) 36, at least an interface 37, at least a memory module 38 and a memory control unit 39. The interface 37 is used, for example, for supplying and/or conveying information to a workstation or a personal computer. In the output annex storage 34 the bytes supplied by the bus system 33 to the access controller 31 (first, processed parts of the cell) are connected to the remaining parts of the cell supplied by the input annex storage 30 and buffered. The output annex storage 34 announces to the access controller 31 when a cell can be received.

Figure 3:
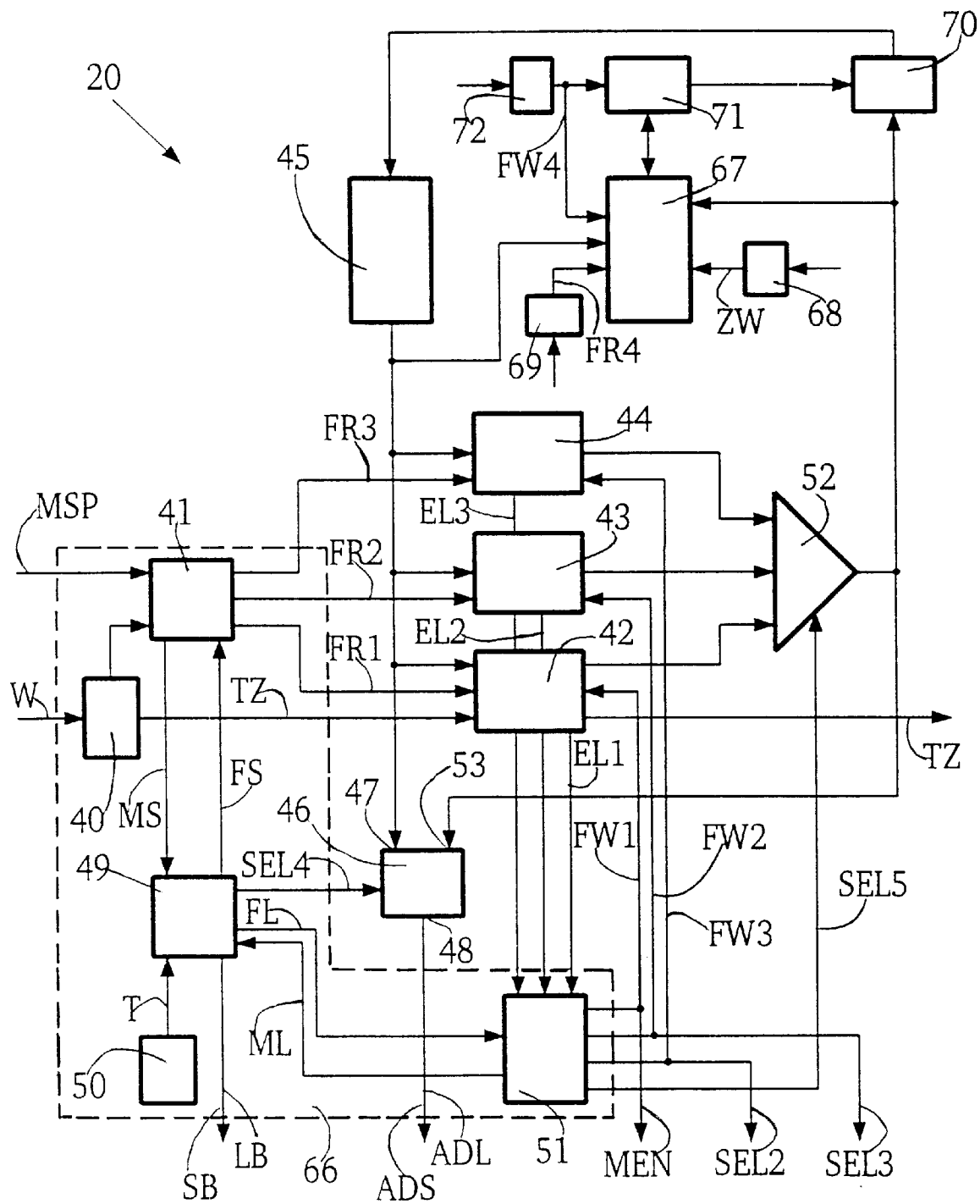
FIG. 3 shows a main memory controller used in the network interface.

FIG. 3 shows an illustrative embodiment of a main memory controller 20. An evaluation circuit 40 included in the main memory controller 20 takes from the routing indicator W supplied by the input multiplexer 17 the destination(s) of a cell to be stored in the main memory 19 and conveys this information about the destination to a write decoder 41 and, if available, a Table pointer TZ included in the routing indicator to a buffer 42 to be buffered. When the write decoder 41 has received a message via the message signal MSP from the receive controller 29 that a cell is to be stored, and further signals which will be explained below, the write decoder 41 releases one or several of the three buffers 42, 43 and 44 via release signal FR1, FR2 or FR3, respectively. Which buffer 42, 43 or 44 is released depends on the destinations of the cell. If the cell is to be fed to the send ring line 12, the buffer 44 is released for writing an address supplied by an address memory 45. If the destination of the cell is the internal connection 14, the buffer 43 is released for writing an address coming from address memory 45. The buffer 42 is released if the cell is to be fed to the input annex storage 30. Either one or several of the buffers 42, 43 or 44 may be released (single path or multipath transmission of a cell). The Table pointer TZ supplied by the evaluation circuit 40 cannot be written until the buffer 42 is released for writing an address.

The address produced by the address memory 45 is also stored in an availability memory 67 together with a count. A count stored at the address produced by the address memory 45 is formed by a count decoder 68. For this purpose, the count decoder 48 is supplied with the release signals FR1, FR2 and FR3, which decoder forms therefrom a in accordance with the following Table:

| | | | count | |
|---|---|---|---|---|
| FR3 | FR2 | FR1 | decimal | binary |
| 0 | 0 | 1 | 1 | 01 |
| 0 | 1 | 0 | 1 | 01 |
| 0 | 1 | 1 | 2 | 10 |
| 1 | 0 | 0 | 1 | 1 |
| 1 | 0 | 1 | 2 | 10 |
| 1 | 1 | 0 | 2 | 10 |
| 1 | 1 | 1 | 3 | 11 |

The release signals FR1 to FR3 have the value "1" if they release a buffer 42, 43 or 44. For example, if the release signal FR3 releases the buffer 44 and the release signal FR1 releases the buffer 42, the count decimal "2" or binary "10" will be formed in the count decoder 68. For an address and a count to be written in the availability memory 67, it is necessary that this memory is released beforehand via a release signal FR4. This release signal FR4 is derived via an OR-gate 69 from the release signals FR1 to FR3.

Figure 4:
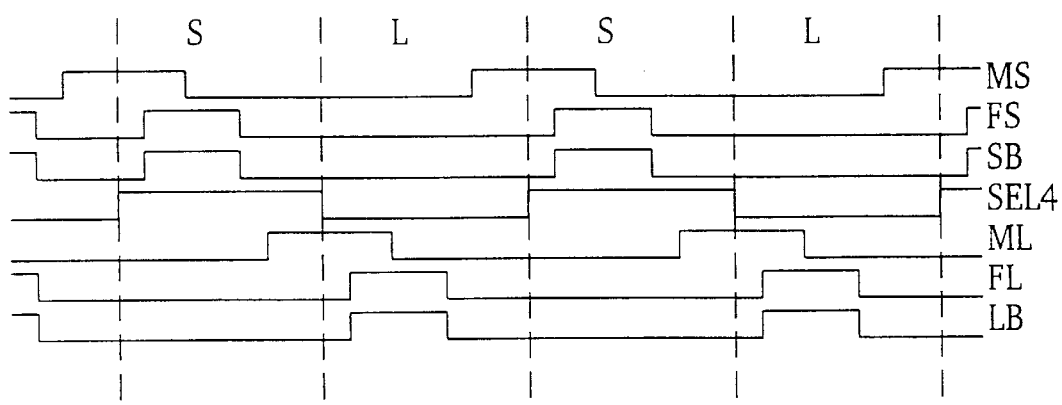
FIG. 4 shows a time diagram for explaining the operation of the main memory controller shown in FIG. 3.

The address written in a buffer 42, 43 or 44 is also fed to a first input 47 of a multiplexer 46. When the first input 47 of the multiplexer 46 is connected to its output 48, the main memory controller 20 feeds a write address ADS to the main memory 19. The multiplexer 46 is controlled via a selection signal SEL4 by a synchronizer 49 which receives an independent clock signal T from a clock generator 50. The synchronizer 49 generates a write cycle S and a read cycle L (compare FIG. 4). During a write cycle S the output 48 of the multiplexer 46 is connected through its first input 47 to the output of the address memory 45. The write decoder 41 announces via a message signal MS (compare FIG. 4) to the synchronizer 49 when the address for a cell is to be written in a buffer 42, 43 or 44. During the write cycle the synchronizer 49 then informs the write decoder 41 via a release signal FS that the buffers 42 to 44 may be released to be written in. The synchronizer 49 furthermore switches a write release signal SB to the main memory 19.

The main memory controller 20 further includes a read decoder 51 which controls the reading from the buffers 42, 43 and 44. As a rule, the read decoder alternately releases via three release signals FW1, FW2 and FW3 the buffers 42 to 44, so that a stored address can be read out. However, if no address occurs in a buffer 42 to 44, this empty buffer 42, 43 or 44 is not released. If no address is found, each buffer 42 to 44 sends a message to the read decoder 51 via message signals EL2, EL3 and EL4.

The read decoder 51 informs via a message signal ML (compare FIG. 4) the synchronizer when a buffer 42, 43 or 44 is to be released. In the case of a read cycle L, the synchronizer 49 informs the read decoder 51 via a release signal FL that this decoder may release a buffer 42 to 44 for an address to be read out. After the release via the release signal FW1, FW2 or FW3, the address is led from a buffer 42, 43 or 44 via a multiplexer 52 to a gate circuit 70, on the one hand, and to the second input 53 of the multiplexer 46, on the other. The multiplexer 52 further receives a selection signal SEL5 from the read decoder 51. If the buffer 42 receives the release signal via the read decoder 51, also a stored Table pointer TZ is fed to the Table 32.

The gate circuit 70 is controlled by a gate controller 71 coupled to the availability memory 67. When an address is supplied by the multiplexer 52, this address is fed to the availability memory 67. Via a release signal FW4 the availability memory 67 is released for the gate controller 71 to read out the count stored at the address. The gate controller 71 formed by logic modules can be elucidated in the light of the following procedure:

1. When release is effected via release signal FW4, the count is decremented;
2. The new count is stored in the availability memory 67;
3. Is new count equal to zero?
4. Yes: Gate circuit is opened;
5. No: Gate circuit continues to be closed.

After the release via the release signal FW4, the count received from the availability memory 67 is decremented in the gate circuit 71. The decremented count is then again written in the availability memory 67. If the count is equal to zero, the gate circuit 70 is opened, so that the address supplied by the multiplexer 52 can reach address memory 45 and be written in the memory. If the count is unequal to zero, the gate circuit 70 continues to be closed. The count which is supplied by the count decoder 68 denotes the number of copies of a cell. If the count is equal to 3, a cell is to be fed to the send ring line 12, to the internal connection 14 and to the control arrangement 26. The release signal FW4 is formed by an OR gate 72 which receives the release signals FW1, FW2 and FW3.

The release signals FW1, FW2 and FW3 also form the selection signals SEL2 and SEL3 and the message signal MEN for the access controller 31, implying that a cell is to be written in the input annex storage 30. The address memory 45 operates according to the FIFO principle (FIFO= First-In, First-Out). After all the addresses have been read out once, the re-entered addresses are read out again by the address memory 45 in the order in which they arrived.

During the read cycle L, the selection command SEL4 (compare FIG. 4) is switched so that the second input 53 of the multiplexer 46 is connected to its output 48. In this manner a buffer 42, 43 or 44 feeds the address as a read address to the main memory 17 via the multiplexers 52 and 46. The synchronizer 49 allows of the reading of a cell from the main memory 19 during the read cycle L. The possibility to read is announced to the main memory 19 via a read signal LB.

It should further be observed that the evaluation circuit 40, the write decoder 41, the synchronizer 49, the clock generator 50 and the read decoder 51 form a decoding device 66.

Figure 5:
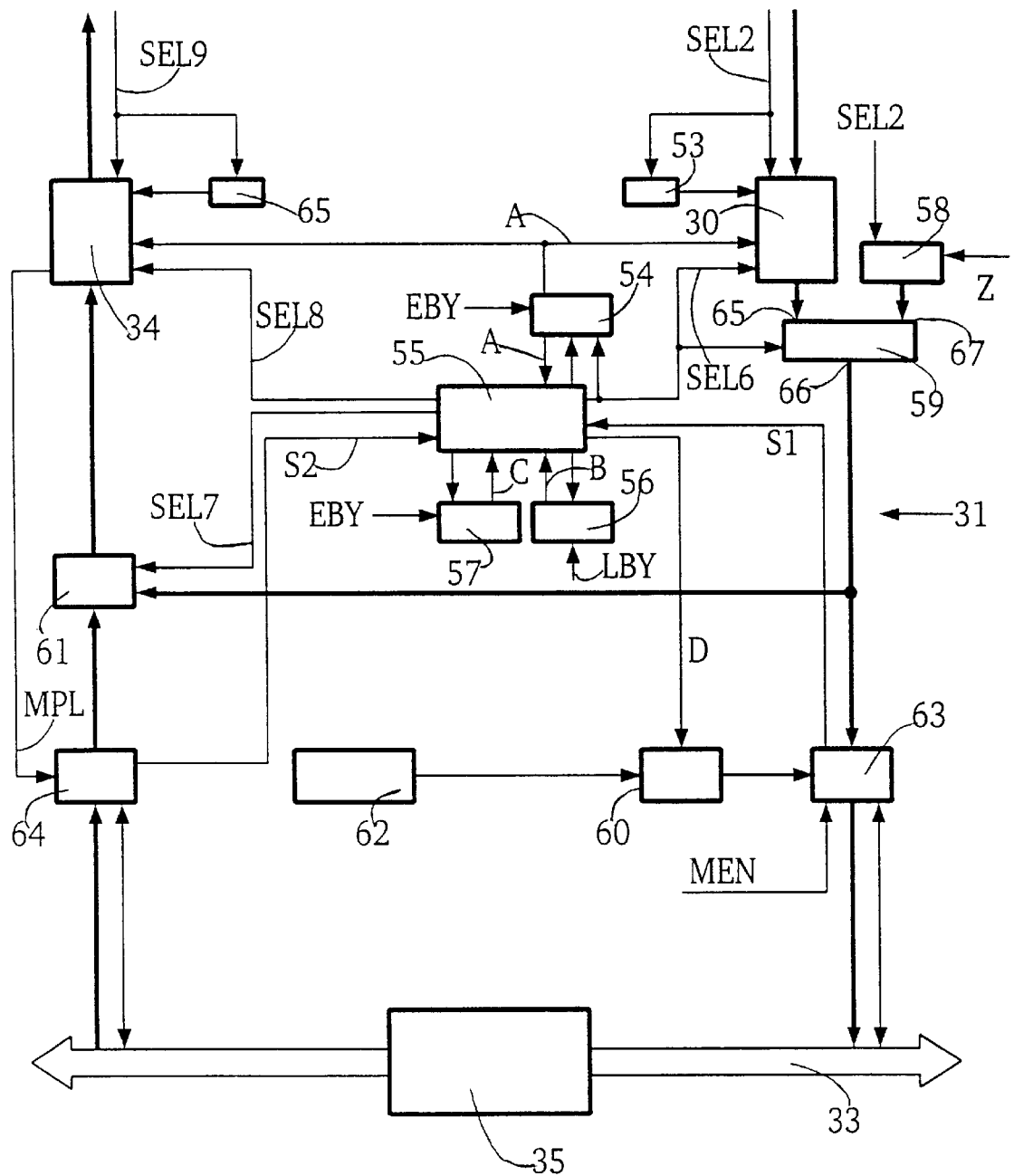
FIG. 5 shows an access controller used in the network interface.

FIG. 5 shows an illustrative embodiment for the access controller 31 which receives cells via the input annex storage 30 from the coupling device 18 and feeds cells to the coupling device 18 via the output annex storage 34. The access controller 31, which forms part of the control arrangement 26, directs cells, bytes of a cell and/or additional information Z coming from the Table 32 to the bus system 33 which, together with the bus controller 35, the interface 37, the arithmetic logic unit 36, the memory module 38 and the memory controller 39, forms part of a processing system. Furthermore, the access controller 31 supplies cells to the output annex storage 34.

The write operation in the input annex storage 30 is controlled by a counter 53 which is started by the selection signal SEL2 and which generates write addresses for the input annex storage 30. The input annex storage 30 is also released via the selection signal SEL2 for a cell to be entered. The byte of a stored cell of the input annex storage 30 is read by a counter 54. The counter 54 forms part of the access controller 31 as do a comparator 55, three registers 56, 57 and 58, three multiplexers 59, 60 and 61, a data bank 62 and two direct memory access controllers 63 and 64.

The Table pointer TZ is applied to the Table 28 in that a cell is transmitted via the demultiplexer 21 to the input annex storage 30. The Table 28 supplies to the access controller 31 at the address featured by the Table pointer TZ additional information Z and/or the address of the first and last bytes to be transmitted (EBY, LBY) of the cell to be stored in the input annex storage 30. The additional information Z supplied by the Table 32 is stored in the register 58 via the selection signal SEL2.

Via the message signal MEN, the direct memory access controller 63 receives via switch 22 a message from the main memory controller 20 when a cell is written from the main memory 19 into the input annex storage 30. As is customary in known direct memory access controllers, the direct memory access controller 63 queries the bus controller 35 about the bus system 33 whether a transfer of bytes is possible. If such a transfer, for example, to the interface 37 is released, the direct memory access controller 63 informs the comparator 55 of this fact via a start signal S1. After being released via the start signal S1, the comparator 55 provides that the address EBY of the first byte stored in the input annex storage 30 is written in the counter 54 and the register 57, and the address LBY of the last byte to be transmitted is written in the register 56.

Once the direct memory access controller 63 has been released, the comparator 55 compares the count A of the counter 54 with the contents B of the register 56. If the contents B of the register 56 exceed the count A of the counter 54, a selection signal SEL6 generated by the comparator 55 causes the counter 54 to increment, the input annex storage 30 to be released for reading out the bytes and the multiplexer 59 to be arranged so that bytes of the input buffer can reach the output 66 of the multiplexer 59 via the input 65. The counter 54 supplies addresses to the input annex storage 30 for the read process.

If the comparator 55 establishes that the count A of the counter 54 is equal to the contents B of the register 56, the counter 54 is blocked via the selection signal SEL6 and the reading of the input annex storage 30 is blocked. Furthermore, via selection signal SEL6, the second input 67 of the multiplexer 59 is connected to its output 66. If additional information Z is stored in the register 58, this information is transmitted to the direct memory access controller 63.

The direct memory access controller 63 is informed in a certain predefined format by the data bank 62 of how many bytes are transmitted from the input annex storage 30 to the bus system 33. Immediately after the write operation the comparator 55 therefore calculates the difference between the addresses EBY and LBY of the first and last bytes. This difference D is used for switching the multiplexer 60, so that the information goes from the data bank 62 to the direct memory access controller 63 in the specified predefined format. Once this information has been received, the direct memory access controller 63 informs the bus system 33 or bus controller 35 of how many bytes are to be transmitted. If the difference is equal to 0, the data bank 62 informs the direct memory access controller 63 that additional information is produced by the multiplexer 59.

Bytes of a cell or a whole cell are read from a unit coupled to the bus system 33 via the further direct memory access controller 64. The bus controller 35 announces via the bus system 33 to the direct memory access controller 64 that bytes are to be transmitted from a unit coupled to the bus system to the output annex storage 34. The direct memory access controller 64 can send bytes to the output annex storage 34 only when this annex storage has previously announced to the direct memory access controller via a message signal MPL that a cell has been stored. If the direct memory access controller 64 is ready for transmission, the comparator 55 is informed thereof via a start signal S2.

After the comparator 55 has been released via the start signal S2, the counter 54 is set to zero and released for upcounting. The counter 54 generates all the addresses for the read process in the output annex storage 34. The comparator 55 compares the count A of the counter 54 with the contents B of the register 56 which register has stored the address of the last byte to be transmitted to the bus system 33, and the contents C of the register 57 which register has stored the address of the first byte to be transmitted to the bus system.

If in a first case $A=B=C=0$ or $A<C$, $A<B$, $B<52$, or $A>C$, $A>B$, $A\leq 52$, the reading from the input annex storage 30 is released via the selection signal SEL6 and the multiplexer 59 is arranged so that its first input 65 is connected to its output 66. The addresses of the counter 54 are also used then. The comparator 55 generates two more selection signals SEL7 and SEL8 for controlling the output annex storage 34 and the multiplexer 61. The selection signal SEL8 causes in said case the output annex storage 34 to be released to be read out. In the first case the selection signal SEL7 causes bytes to go from the multiplexer 59 to the output annex storage 34 via the multiplexer 61. It should further be observed that the count 52 is obtained in that the counter 54 starts counting at zero and 53 bytes are contained in a cell.

In a second case, if $A\geq C$, $A\leq B$, $B<52$ or $C=B=52$ or $A=52$, the comparator 55 sets the selection signal SEL in such a way that the reading from the input annex storage 30 is blocked. The selection signal SEL7 controls the multiplexer 61 in such a way that the output annex storage 34 receives cells from the direct memory access controller 64.

If the counter 54 shows the count 52, it is blocked by the comparator 55. At least the selection signal SEL8 is changed, so that after the last byte of the cell has been written in the output annex storage 34, this annex storage is blocked as regards writing.

If a cell is buffered in the output annex storage 34, the receiving circuit 25 is informed of this fact. If the cell can be evaluated in the receiving circuit 25, this circuit releases the reading of the cell from the output annex storage 34 via a release signal SEL9. Furthermore, a counter 65 is started which generates from the output annex storage 34 the 20 addresses for the read operation.

Additional information is supplied to the bus system 33 by the access controller 31, for example, if cells are counted for a specific connection, for example, for an allocation of charges. Cells used for monitoring purposes include monitoring information, for example, in the first byte of the information field of the cell. In this case only the header field and the first byte of the information field could be applied to the bus system by the access controller 31. If, for example, a cell is used for transmitting an ATM ¾ type adaptation layer, the access controller 31 transmits in that case 44 bytes of the information field to the bus system 33.

What is claimed is:

1. A packet switching system comprising a switching device, wherein said switching device comprises:
   a main memory for buffering packets arriving by auxiliary lines;
   a main memory controller for generating addresses to store the packets in the main memory and for controlling write and read operations of the packets; and
   a demultiplexer controlled by said main memory controller, for transporting the packets by trunk lines,
   characterized in that said main memory controller comprises
   an address memory for producing an address for a write operation,
   a respective buffer assigned to each said trunk line, for buffering the addresses produced by the address memory, and
   a decoding device,
   wherein the decoding device includes means for selecting a buffer for storing an address in dependence on a destination of a packet, means for selecting a buffer for producing an address intended to be read from said main memory, and means for accordingly controlling said demultiplexer.

2. A packet switching system as claimed in claim 1, characterized in that the decoding device comprises an evaluation circuit for evaluating the destination based upon a routing indicator added to the packet and a write decoder receiving the destination from the evaluation circuit, wherein the write decoder is used for releasing a buffer during a write cycle, the released buffer being featured for buffering an address.

3. A packet switching system as claimed in claim 1, characterized in that the decoding device comprises a read decoder including means for releasing the buffers during a read cycle in a predefined order so that the addresses can be read out.

4. A packet switching system as claimed in claim 1, characterized in that:

said packet switching system is arranged as a local area switching network operating in an asynchronous transfer mode (ATM) for transmitting packets of a fixed length, the local area network comprises a plurality of stations which are coupled to send and receive ring lines via network interfaces, and each network interface comprises a coupling device coupled (a) via auxiliary lines (i) to a receive ring line, (ii) a station and (iii) a control arrangement, and (b) via trunk lines to (i) a send ring line, (ii) a station and (iii) a control arrangement.

5. A packet switching system as claimed in claim 4, characterized in that:

said demultiplexer transfers packets produced by the main memory to (i) a send ring line, to (ii) a station and to (iii) a control arrangement, and a read decoder of said main memory controller controls the demultiplexer.

6. A packet switching system as claimed in claim 1, characterized in that the address memory includes means for receiving addresses used for the read operation and coming from the buffers, and after a first issue of all the addresses, means for producing further addresses in an order realized by the buffers.

7. A packet switching system as claimed in claim 6, characterized in that the decoding device comprises an evaluation circuit for evaluating the destination based upon a routing indicator added to the packet and a write decoder receiving the destination from the evaluation circuit, wherein the write decoder is used for releasing a buffer during a write cycle, the released buffer being featured for buffering an address.

8. A packet switching system as claimed in claim 7, characterized in that the decoding device comprises a read decoder including means for releasing the buffers during a read cycle in a predefined order so that the addresses can be read out.

9. A packet switching system as claimed in claim 8, characterized in that:

said packet switching system is arranged as a local area switching network operating in an asynchronous transfer mode (ATM) for transmitting packets of a fixed length, the local area network comprises a plurality of stations which are coupled to send and receive ring lines via network interfaces, and each network interface comprises a coupling device coupled (a) via auxiliary lines (i) to a receive ring line, (ii) a station and (iii) a control arrangement, and (b) via trunk lines to (i) a send ring line, (ii) a station and (iii) a control arrangement.

10. A packet switching system as claimed in claim 9, characterized in that:

the coupling device comprises an input multiplexer for transporting packets coming from the auxiliary lines to said main memory and for separating a routing indicator added to each packet and transporting the same to said main memory controller, and a receive controller for establishing arrival of packets from (i) a receive ring, (ii) a station and (iii) a control arrangement controls the input multiplexer.

11. A packet switching system as claimed in claim 10, characterized in that:

said demultiplexer transfers packets produced by the main memory to (i) a send ring line, to (ii) a station and to (iii) a control arrangement, and a read decoder of said main memory controller controls the demultiplexer.

12. A packet switching system comprising a switching device, wherein said switching device comprises:

a main memory for buffering packets arriving by auxiliary lines;

a main memory controller for generating addresses to store the packets in the main memory and for controlling write and read operations of the packets; and a demultiplexer controlled by said main memory controller, for transporting the packets by trunk lines, wherein said main memory controller comprises (i) an address memory for producing an address for a write operation, (ii) a respective buffer assigned to each said trunk line, for buffering the addresses produced by the address memory, (iii) a decoding device, wherein the decoding device includes means for selecting a buffer for storing an address in dependence on a destination of a packet, means for selecting a buffer for producing an address intended to be read from said main memory, and means for accordingly controlling said demultiplexer;

the system further comprises a local area network operating in an asynchronous transfer mode (ATM) for transmitting packets of a fixed length, wherein the local area network comprises a plurality of stations coupled to send and receive ring lines via network interfaces, further wherein each network interface comprises a coupling device coupled (a) via auxiliary lines (i) to a receive ring line, (ii) a station and (iii) a control arrangement and (b) via trunk lines to (i) a second ring line, (ii) a station and (iii) a control arrangement; and the coupling device comprises an input multiplexer for transporting packets coming from the auxiliary lines to said main memory and for separating a routing indicator added to each packet and transporting the same to said main memory controller, and wherein a receive controller for establishing an arrival of packets from (i) a receive ring line, (ii) a station and (iii) a control arrangement controls the input multiplexer.

13. A packet switching system as claimed in claim 12, characterized in that:

said demultiplexer transfers packets produced by the main memory to (i) a send ring line, to (ii) a station and to (iii) a control arrangement, and a read decoder of said main memory controller controls the demultiplexer.

14. A packet switching system comprising a switching device, wherein said switching device comprises:

a main memory for buffering packets arriving by auxiliary lines;

a main memory controller for generating addresses to store the packets in the main memory and for controlling write and read operations of the packets; and a demultiplexer controlled by said main memory controller, for transporting the packets by trunk lines, wherein said main memory controller comprises (i) an address memory for producing an address for a write operation, (ii) buffers assigned to each trunk line, for buffering the addresses produced by the address memory, (iii) a decoding device, wherein the decoding device includes means for selecting a buffer for storing an address in dependence on a destination of a packet, means for selecting a buffer for producing an address intended to be read from said main memory, and means for accordingly controlling said demultiplexer, (iv) an availability memory for storing a count for a number of copies of a packet contained in the buffers, (v) a gate circuit, when released, for conveying an address read from a buffer, and (vi) a gate controller for decrementing the count and for releasing the gate circuit when the count and a predefined value match.

15. A packet switching system as claimed in claim 14, characterized in that the decoding device comprises an evaluation circuit for evaluating the destination based upon a routing indicator added to the packet and a write decoder receiving the destination from the evaluation circuit, wherein the write decoder is used for releasing a buffer during a write cycle, the released buffer being featured for buffering an address.

16. A packet switching system as claimed in claim 15, characterized in that the decoding device comprises a read decoder including means for releasing the buffers during a read cycle in a predefined order so that the addresses can be read out.

17. A packet switching system as claimed in claim 16, characterized in that:

said packet switching system is arranged as a local area switching network operating in an asynchronous transfer mode (ATM) for transmitting packets of a fixed length, the local area network comprises a plurality of stations which are coupled to send and receive ring lines via network interfaces, and each network interface comprises a coupling device coupled (a) via auxiliary lines (i) to a receive ring line, (ii) a station and (iii) a control arrangement, and (b) via trunk lines to (i) a send ring line, (ii) a station and (iii) a control arrangement.

18. A packet switching system as claimed in claim 17, characterized in that:

the coupling device comprises an input multiplexer for transporting packets coming from the auxiliary lines to said main memory and for separating a routing indicator added to each packet and transporting the same to said main memory controller, and a receive controller for establishing arrival of packets from (i) a receive ring, (ii) a station and (iii) a control arrangement controls the input multiplexer.

19. A packet switching system as claimed in claim 18, characterized in that:

said demultiplexer transfers packets produced by the main memory to (i) a send ring line, to (ii) a station and to (iii) a control arrangement, and a read decoder of said main memory controller controls the demultiplexer.

20. A network interface for a local area network operating in an asynchronous transfer mode (ATM), said network interface comprising (i) means for coupling to a station and to send and receive ring lines, and (ii) a coupling device comprising a main memory for buffering packets arriving on a receive ring line, coming from a station or coming from a control arrangement, and a main memory controller, characterized in that said main memory controller comprises:

an address memory for supplying addresses to said main memory and for a write operation, a buffer assigned to each of a send ring line, the station, and the control arrangement, for buffering the addresses produced by the address memory, and a decoding device including:

a demultiplexer for conveying packets to the send ring line, the station and the control arrangement, means for selecting a buffer for storing an address in dependence on a destination of a packet, means for selecting a buffer for producing an address intended for a read operation, and means for accordingly controlling said demultiplexer.

* * * * *